June 9, 1964 H. W. DIETERT ETAL 3,136,010
METHOD AND APPARATUS FOR TESTING AND CONTROLLING
MOLDABILITY OF GRANULAR MATERIAL
Filed March 23, 1961 5 Sheets-Sheet 1

INVENTORS
HARRY W. DIETERT
RANDOLPH L. DIETERT
BY ALEXANDER L. GRAHAM
RALPH E. STEINMUELLER
HOWARD L. JAMESON
*Whittemore, Hulbert & Belknap* ATTORNEYS June 9, 1964 H. W. DIETERT ETAL 3,136,010
METHOD AND APPARATUS FOR TESTING AND CONTROLLING
MOLDABILITY OF GRANULAR MATERIAL
Filed March 23, 1961 5 Sheets-Sheet 2

INVENTORS
HARRY W. DIETERT
RANDOLPH L. DIETERT
BY ALEXANDER L. GRAHAM
RALPH E. STEINMUELLER
HOWARD L. JAMESON

ATTORNEYS

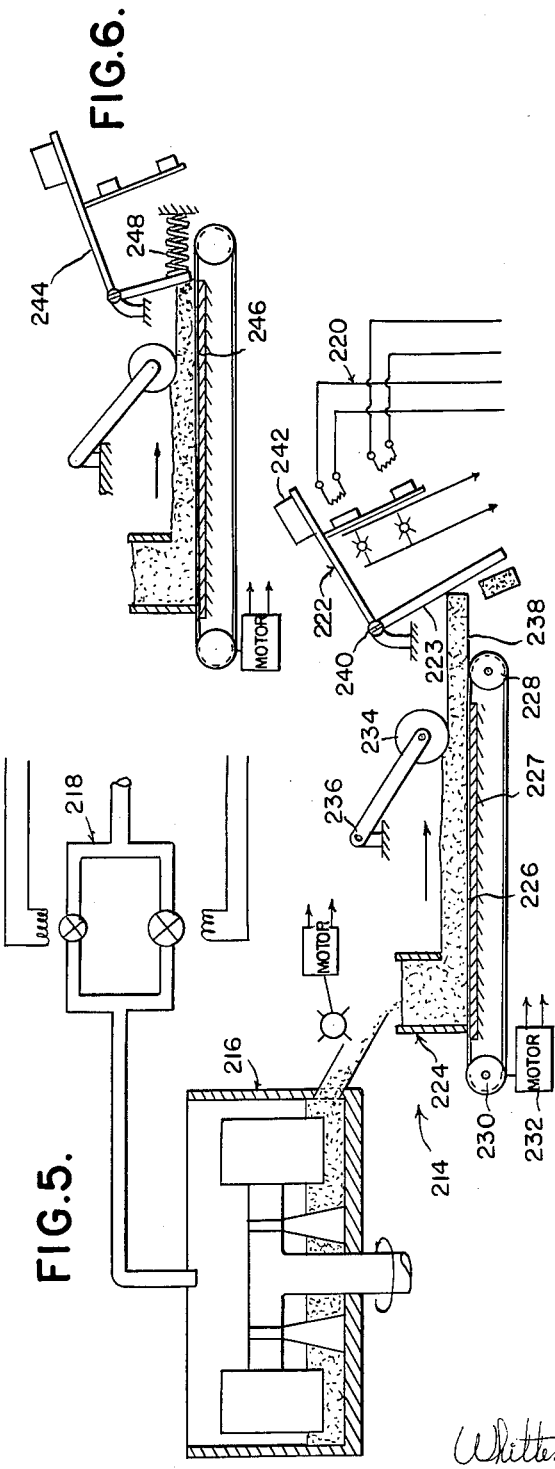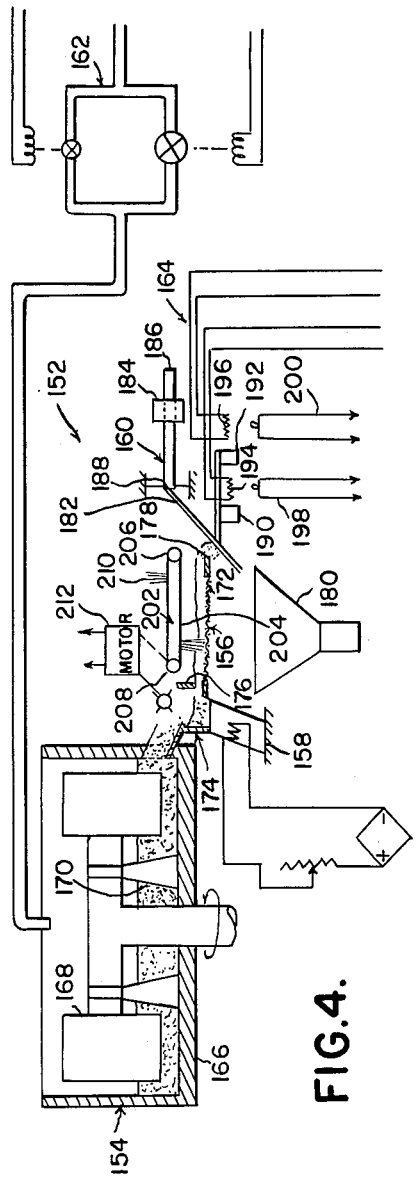

United States Patent Office 3,136,010
Patented June 9, 1964

3,136,010
METHOD AND APPARATUS FOR TESTING AND CONTROLLING MOLDABILITY OF GRANULAR MATERIAL
Harry W. Dietert, Kerrville, Tex., and Randolph L. Dietert, Alexander L. Graham, and Ralph E. Steinmueller, Detroit, and Howard L. Jameson, Ferndale, Mich., assignors to Harry W. Dietert Co., Detroit, Mich., a corporation of Michigan
Filed Mar. 23, 1961, Ser. No. 97,862
14 Claims. (Cl. 22—89)

The invention refers to material conditioning and relates more specifically to a method of and apparatus for controlling the moldability of a granular material.

In the past conditioning of granular material such as foundry sand has sometimes been accomplished by measuring the moisture content and temperature of a granular material and adding water to the granular material until the moisture content reaches a particular value predetermined for the measured temperature of the granular material.

It has however been found that the moldability of the granular material which is the property it is desired to control by the conditioning of the granular material is a function of factors other than the moisture content and temperature of the granular material. These other factors may include the composition of the granular material and the physical size of the particles thereof among other things.

It is therefore desirable to measure the moldability or toughness of the granular material directly and to meter additives into the granular material in accordance with the moldability measurement to provide a desired moldability rather than to attempt to regulate the moldability of the granular material in accordance with the measurement of the relative quantity of an additive mixed with the granular material.

Accordingly it is one of the objects of the present invention to provide improved apparatus for controlling the moldability of granular material.

Another object is to provide an improved method for controlling the moldability of granular material.

Another object is to provide apparatus for controlling the moldability of granular material comprising a mill for mixing the granular material and an additive, means for separating the granular material with the additive mixed therewith in accordance with the moldability thereof, a frictionless balance for sensing the moldability of the separated granular material, and means responsive to the sensed moldability of the granular material for metering the additive thereto.

Another object is to provide apparatus for controlling the moldability of granular material as set forth above wherein the means for metering the granular material includes a pair of light sensitive units and shields for the light sensitive units carried by and movable with the frictionless balance operable to cause the additive to be metered to the granular material in two stages.

Another object is to provide apparatus for controlling the moldability of granular material as set forth above wherein the frictionless scale comprises a band of relatively rigid elastic material fixedly mounted at each end, an inclined plate secured to one side of the band and balanced by means of an adjustable weight secured to the other side of band.

Another object is to provide apparatus for controlling the moldability of granular material as set forth above wherein the separating means includes a vibrating screen over which the granular material is passed and brush means for cleaning the screen.

Another object is to provide apparatus for controlling the moldability of granular material comprising a mill in which the granular material and an additive are mixed, means for uniformly compacting a predetermined specimen of the granular material and passing it over the edge of a supporting plate, balance means positioned in accordance with the bending strength of the compacted granular material, and means associated with the balance means for metering an additive to the granular material in the mill in accordance with the position of the balance means.

Another object is to provide means for controlling the moldability of a granular material as set forth above wherein the granular material after being compacted engages one surface of a spring biased balance to position the spring biased balance in accordance with the compressive strength of the granular material.

Another object is to provide means for controlling the moldability of a granular material comprising a mill having an opening therein, rollers movable within the mill to periodically force compacted granular material through the opening therein and means positioned adjacent the opening in the mill to meter an additive to the granular material in the mill in accordance with the bending strength of the granular material forced through the opening in the mill.

Another object is to provide a method of conditioning granular material comprising continuously mulling the granular material in a mill, metering an additive into the mill to vary the moldability of the granular material in the mill, sensing the moldability of a uniform sample of the granular material, and controlling the metering of the additive into the mill in accordance with the sensed moldability.

Another object is to provide a method of and apparatus for controlling the moldability of granular material which is simple, economical and efficient.

Other objects and features of the invention will become apparent as the description proceeds, especially when taken in conjunction with the accompanying drawings, illustrating preferred embodiments of the invention, wherein.

Figure 1:
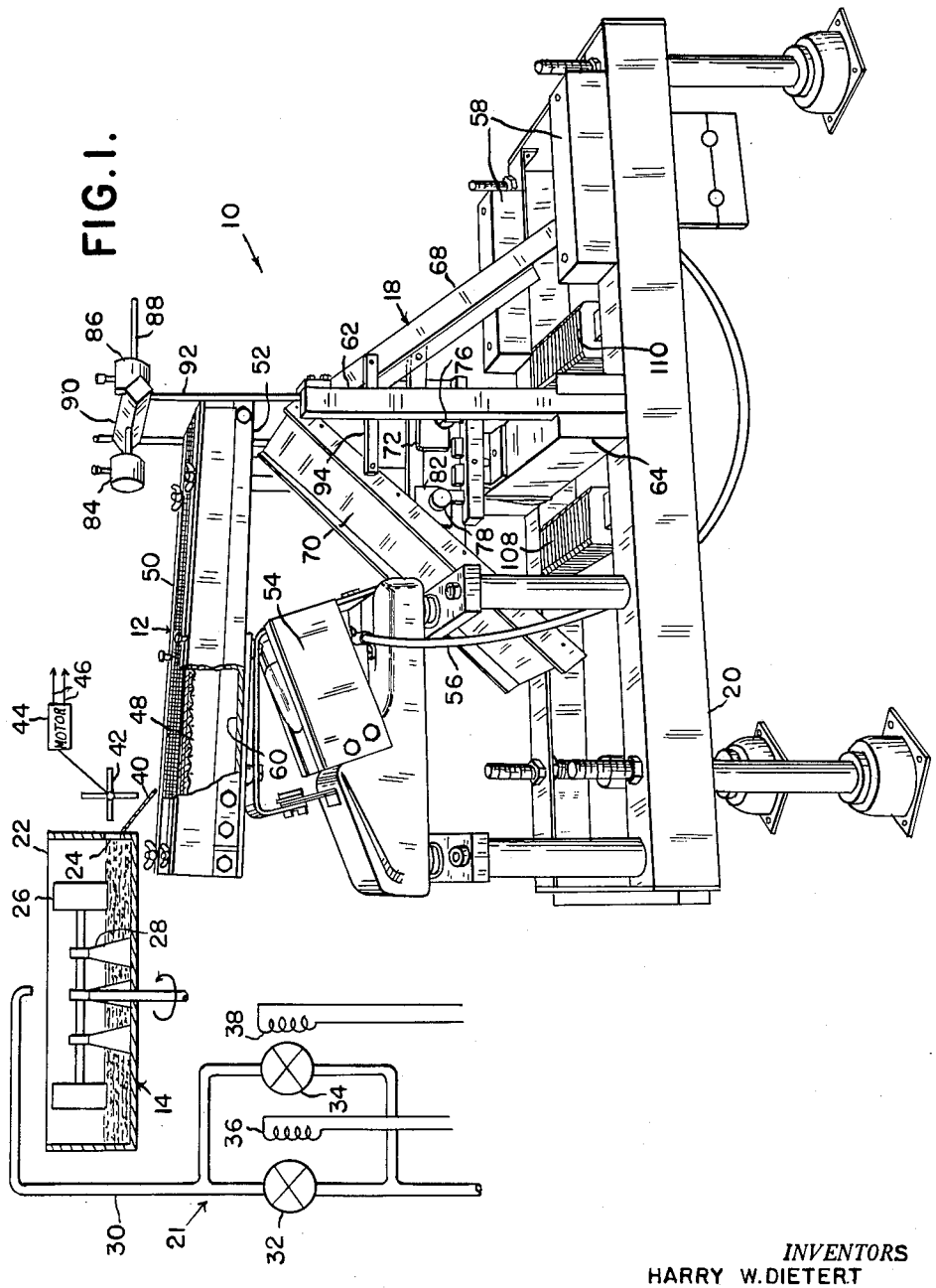
FIGURE 1 is a diagrammatic illustration partly in perspective and broken away of apparatus for controlling the moldability of granular material in accordance with the method of the invention.
Figure 3:
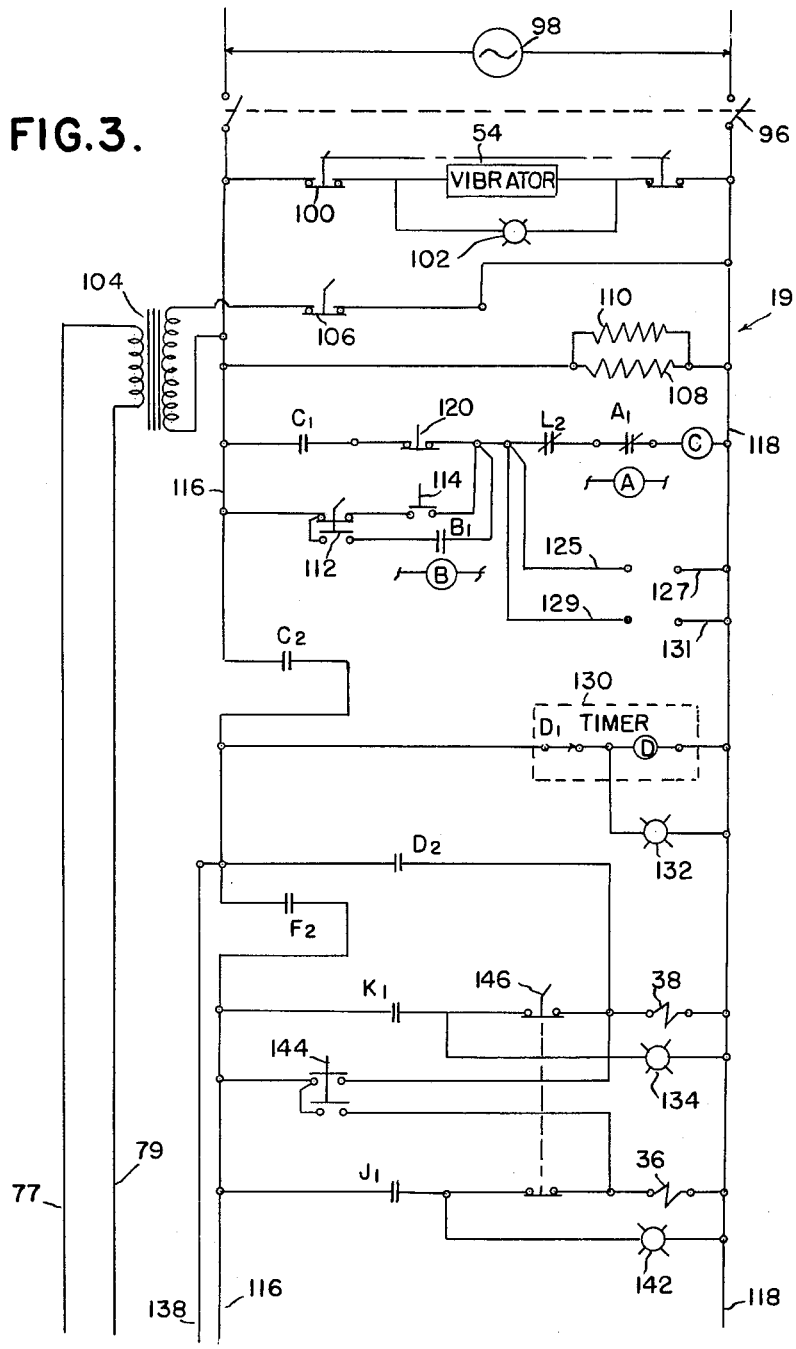
Figure 3A:
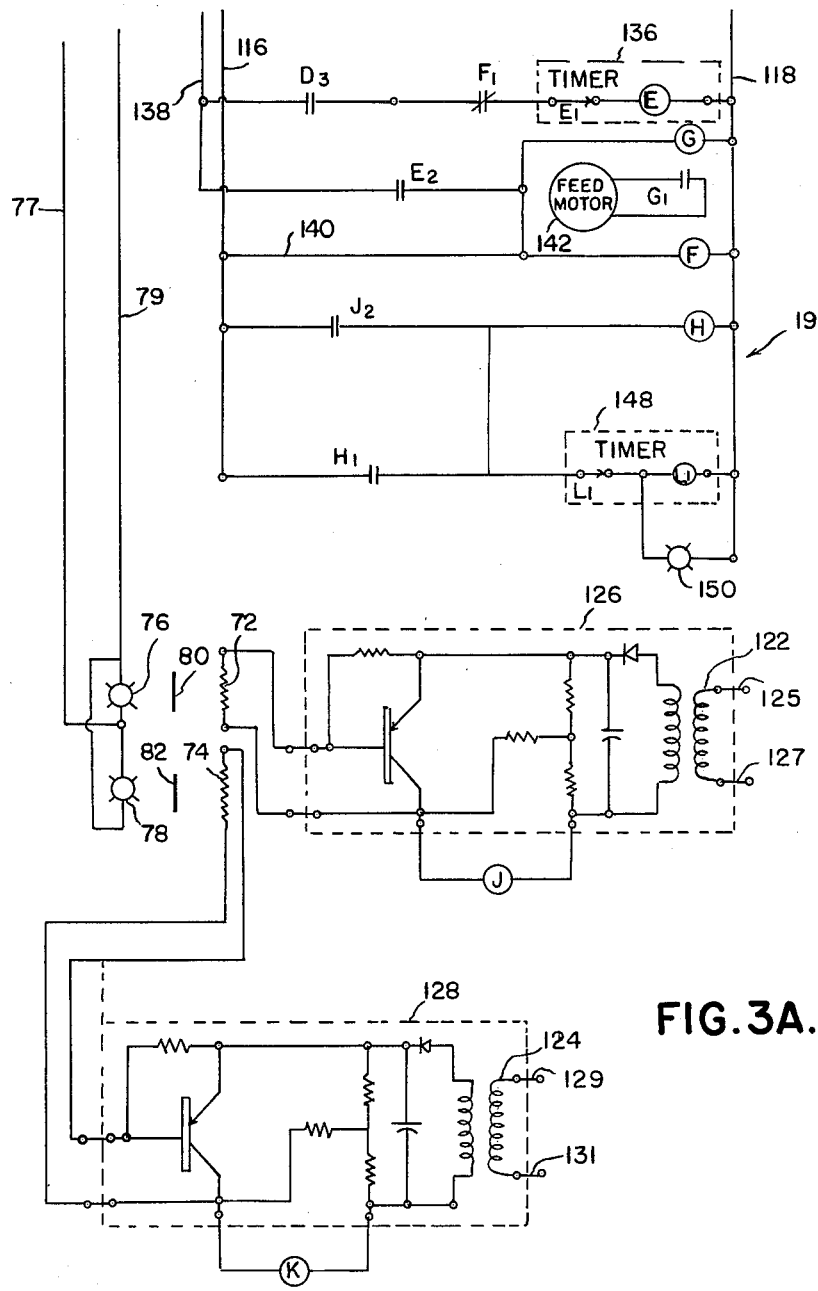

FIGURES 3 and 3–A are a schematic diagram of the means for controlling the metering of the additive to the apparatus for controlling the moldability of granular material illustrated in FIGURE 1.

FIGURE 4 is a diagrammatic representation of a modification of the apparatus of FIGURE 1 for controlling the moldability of granular material.

FIGURE 5 is a diagrammatic representation of another modification of the apparatus of FIGURE 1 for controlling the moldability of granular material.

FIGURE 6 is a diagrammatic representation of a modification of the apparatus of FIGURE 5 for controlling the moldability of granular material.

Figure 7:
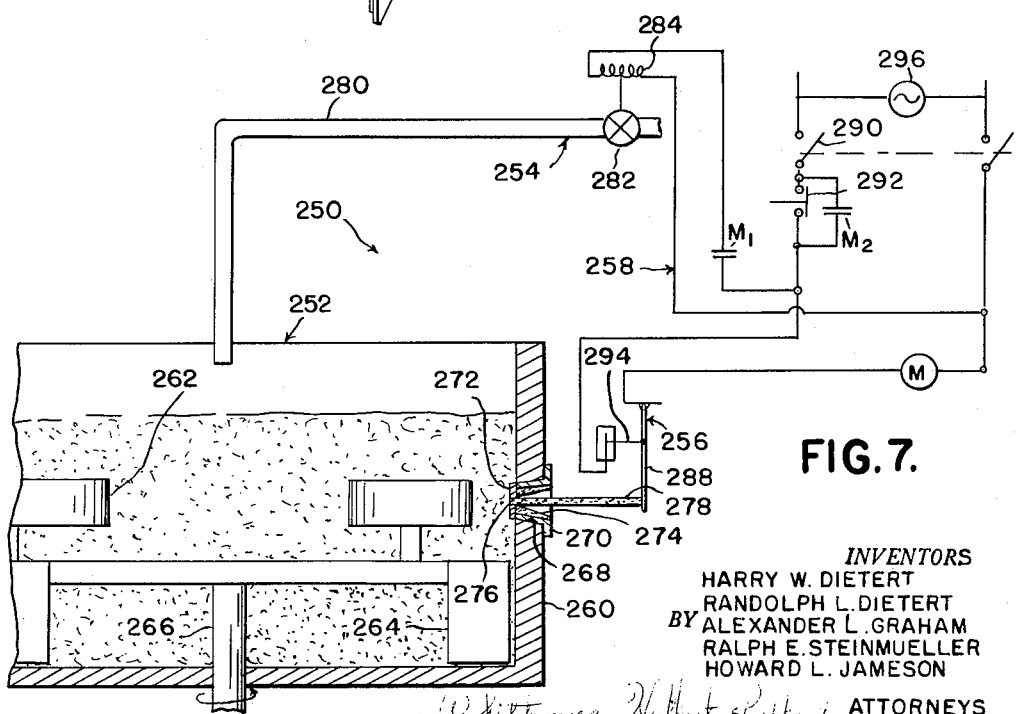

FIGURE 7 is a diagrammatic representation of a still further modification of the apparatus of FIGURE 1 for controlling the moldability of granular material.

With particular reference to the figures one embodiment of the invention will now be disclosed.

The apparatus 10 for controlling the moldability of granular material illustrated in FIGURE 1 includes the separating means 12 positioned to receive a sample quantity of granular material from the mill 14 and the vibrator 16 for vibrating the separator 12 to separate the granular material received by the separator in accordance with the moldability thereof. The frictionless balance 18 mounted on the vibration dampening frame 20 is also an integral part of the apparatus 10 and is positioned in accordance with the moldability of the granular material received by the separator to regulate the control means 19 for controlling the quantity of additive metered to the granular material in the mill 14 through the metering means 21 whereby granular material having a predetermined moldability is produced in the mill.

More specifically the mill 14 illustrated in FIGURE 1 comprises the cylindrical container 22 adapted to receive granular material through the open top thereof and having an opening 24 in one side adjacent the separating means 12 through which samples of granular material in the mill are discharged into the separator 12. Mill 14 also includes the rollers 26 for compacting the granular material and scrapers 28 for agitating the granular material. The scrapers 28 and rollers 26 together thoroughly mix the granular material deposited in the mill 14 with additives such as water which are metered into the mill 14 to control the moldability of the granular material therein.

In the embodiment of the invention illustrated in FIGURE 1 the means 21 for metering the additive into the mill 14 to control the moldability of the granular material therein includes the pipe 30 and control valves 32 and 34 which are of different size and are connected in parallel in pipe 30. When the valve 32 is open a relatively large quantity of additive is metered through pipe 30 to mill 14 and when only valve 34 is open a relatively small quantity of additive is metered to the mill 14. Valves 32 and 34 are controlled by solenoids 36 and 38 respectively in accordance with the moldability of the granular material in the mill 14 as determined by the apparatus 10 as will later be more evident.

During mixing of the granular material in the mill 14 a sample quantity of the granular material is passed through the opening 24 in the mill 14 onto the inclined guide plate 40 and is transferred over plate 40 to the separator 12. In passing over the plate 40 to the separator 12 the granular material passes the paddle 42 rotated by motor 44 which may be energized through electrical conductors 46 from a source of electric energy (not shown). Th paddle 42 serves to break up compacted granular material passing from the mill 14 to the separator 12.

The separator 12 includes the screen 48 on which the granular material from the mill 14 is deposited positioned in an elongated channel shaped container 50, as illustrated in FIGURE 1. The screen 48 extends beyond the end 52 of the bottom 60 of the container 50, as shown in FIGURE 1.

The container 50 is supported on vibrating means 54 which is energized through electric conductors contained in cable 56 from the control means illustrated in FIGURES 3 and 3-A contained in the control units 58 illustrated in FIGURE 1. The vibrator 54 may be of the type known in the art as a Syntron vibrator which operates to produce a relatively fast movement of the separator in one direction and a relatively slow recovery in the opposite direction to transfer material deposited at the left end of the separating means 12 to the right end thereof, as shown in FIGURE 1.

Thus in operation the granular material deposited on the screen 48 will be caused to move from left to right along the separator 12 and will divide between the screen 48 and the bottom 60 of the separator in accordance with the moldability of the granular material as set forth in copending application, Serial No. 83,074, where the moldability is defined in accordance with the following:

$$\text{Moldability} = \frac{B}{A+B} \cdot 100$$

where B is the quantity of material falling through the screen 48 and A is the quantity of material passing completely over the screen 48. That is to say with the terms toughness and moldability as defined in co-pending application, Serial No. 83,074, material having a low toughness and high moldability will divide in traversing the length of the separator 12 so that a larger percentage of the material passes through the screen 48 and travels along the bottom of the separator 12. Conversely with material having a low moldability and high toughness more of the granular material deposited on screen 48 will travel the length of the separator 12 without passing through the screen 48.

The relative quantities of the material passing through the separator 12 on the screen 48 and on the bottom 60 are sensed by means of the frictionless balance 18 as a measure of the moldability of the granular material.

Figure 2:
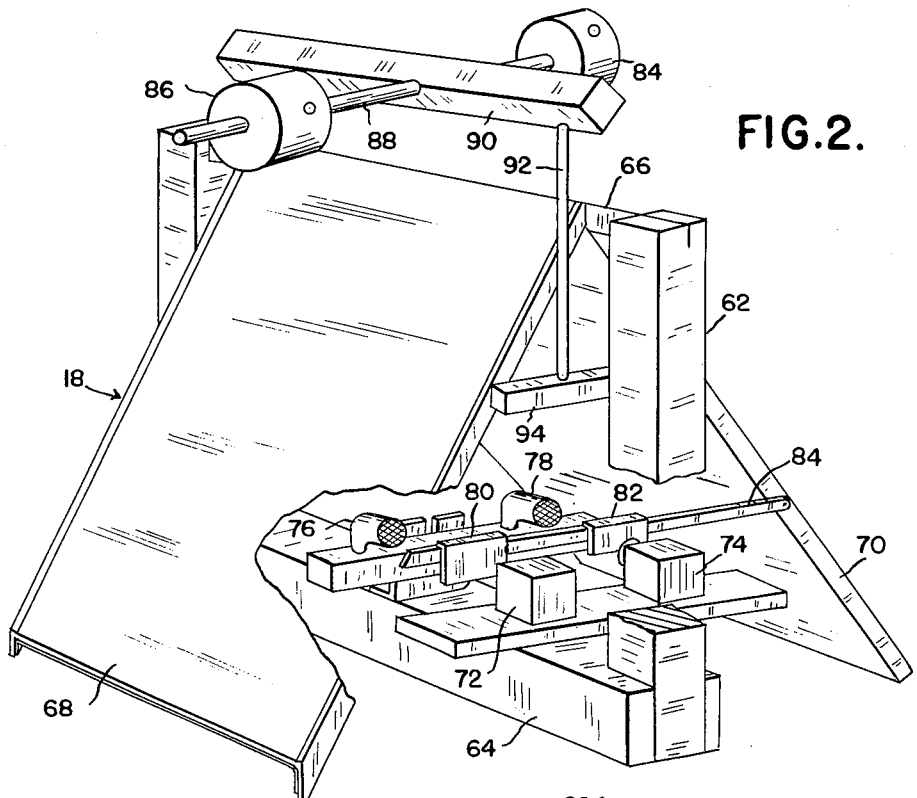
FIGURE 2 is an enlarged partly broken away diagrammatic perspective view of a portion of the apparatus for controlling the moldability of granular material illustrated in FIGURE 1.

The frictionless balance 18, as shown in FIGURES 1 and 2, comprises a pair of vertical posts 62 supported on a cross bar 64 of the vibration dampening frame 20, the resilient relatively rigid band 66 fixedly secured at the opposite ends thereof to the posts 62 and the inclined balance planes 68 and 70 secured to opposite sides of the band 66. The band 66 is deflected due to torsion applied thereto through the balance planes in proportion to the relative weight of granular material falling thereon from the end of the screen 48 and bottom 60 of the separator 12.

If the granular material is of a relatively high moldability more of it will fall on the balance plane 70 from the end of the bottom 60 of the separator than will fall on the balance plane 68 from the end of the screen 48 to cause the balance to pivot counterclockwise about the frictionless pivot band 66. Conversely if the moldability of the granular material deposited in the separator 12 is low more granular material will fall on balance plane 68 than on balance plane 70 to pivot the balance 18 clockwise about the band 66.

The position of the balance 18 is therefore a measure of the moldability of the granular material in the mill 14. The valves 32 and 34 may therefore be controlled in accordance with the position of balance 18 by means of the solenoids 36 and 38 to meter a large quantity of a moldability increasing additive such as water to the mill 14 when the moldability of the granular material is high and to meter a lesser quantity of additive to the mill 14 when the moldability of the granular material approaches a desired value.

The means for controlling the valves 32 and 34 in accordance with the position of the balance 18 includes light sensitive resistors 72 and 74, light sources 76 and 78 and light shields 80 and 82. The light sensitive resistors and the light sources are secured in fixed positions on frame 20 relative to the balance 18, as illustrated in FIGURES 1 and 2. The light shields 80 and 82, illustrated best in FIGURE 2 are adjustably supported on the bar 84 extending between the balance planes 68 and 70.

In operation the shield 80 shields the light sensitive resistor 72 from light emitted by light source 76 with the balance 18 in a predetermined position while the shield 82 is adapted to similarly shield the light sensitive resistor 74 from the light emitted by light source 78 with the balance 18 in a different predetermined position. With the balance 18 in counterclockwise positions from the predetermined positions light from the respective light sources illuminates the corresponding light sensitive resistors.

The complete operation of the apparatus 10 for controlling the moldability of granular material in mill 14 will be considered in conjunction with the control circuit illustrated in FIGURES 3 and 3-A. The components of the control circuit illustrated in FIGURES 3 and 3-A except as otherwise indicated may be included within the control units 58 mounted on the vibration dampening frame 20 as illustrated in FIGURE 1.

Thus most of the components of the apparatus 10 are isolated from the influence of external vibrations. Vibrator 54 however produces sufficient vibration of balance 18 to prevent sticking of the granular material on the inclined balance planes 68 and 70 and to insure that the granular material slides uniformly off of the balance planes.

It will be assumed in considering the operation of the apparatus 10 that the additive is water, that a granular material conditioning cycle has just been completed and that granular material having a predetermined moldability has just been removed from the mill 14 in accordance with the sequencing of the over-all operation with which the granular material is to be used. At this time no granular material will be in the mill 14 or in the separator 12. Further the balance 18 will be pivoted into a limiting clockwise position as shown in FIGURE 1 due to the relative positioning of the biasing weights 84 and 86 which are movably supported on the bar 88 secured to the balance 18 by the mounting bars 90, 92 and 94, as shown best in FIGURE 2.

At this time the on-off toggle switch 96 is closed so that the vibrator 54 is energized from the source of electrical energy 98, as shown in FIGURE 3. It will be understood that the vibrator 54 includes a rectifier so that the alternating electrical signal from the source 98 is suitable for energizing the vibrator. The vibrator on-off switch 100 is of course also closed at this time and the indicator lamp 102 will be lit to indicate operation of the vibrator 54.

The transformer 104 is also energized at this time through the closed light source on-off switch 106 so that light sources 76 and 78 in FIGURE 3-A are energized over conductors 77 and 79. The strip heaters 108 and 110, illustrated in FIGURE 1, are energized through switch 96 along with the light sources and vibrator and serve to heat the apparatus 10 which in use is provided with a cover (not shown) secured to the support 20.

With the apparatus 10 thus energized the actual granular material conditioning cycle may be started either manually with the automatic manual selector switch 112 in the position indicated in FIGURE 3 by pressing the normally open start switch 114 to complete a circuit from conductor 116 through the upper portion of switch 112, the switch 114, across contacts L-2 which are normally closed and which open only after completion of the conditioning cycle, across normally closed contacts A-1 which are open only during dumping of conditioned granular material from the mill 14 and relay coil C to the conductor 118 at the opposite side of the source of electrical energy 98 from the conductor 116. Contacts A-1 are open in accordance with the sequencing of the over-all operation in which the conditioned granular material is used.

Similarly if automatic cycling of the granular material conditioning apparatus 10 is desired in sequence with the over-all operation with which the apparatus 10 is used the manual automatic switch 112 is moved to the lower position thereof and the normally open contacts B-1 are closed by means of the relay coil B in an external sequencing circuit. Thus the relay coil C may be energized either automatically or manually at any time granular material is not being discharged from the mill 14.

Energizing the relay coil C closes the normally open contacts C-1 to complete a holding circuit between conductors 116 and 118 for the continued energizing of relay coil C until relay contacts L-2 open at the end of a conditioning cycle or the stop switch 120 is manually actuated to break the circuit therethrough.

Completing the circuit between the conductors 116 and 118 just described energizes the transformers 122 and 124 shown in FIGURE 3 of amplifiers 126 and 128 through conductors 125 and 127 and 129 and 131, respectively. Amplifiers 126 and 128 are thus capable of producing activating current in relay coils J and K, respectively, on illumination of the light sensitive resistors 72 and 74 by light sources 76 and 78, respectively.

On energizing relay coil C the normally open contacts C-2 are also closed whereby the timer 130 having relay coil D and contacts D-1 therein is energized as indicated by the light 132. Energizing the relay coil D of the timer 130 causes the normally open contacts D-2 to close whereby solenoid 38 is energized to open the valve 34 and permit flush water to be metered to the mill 14, as indicated by light 134. After a predetermined period of time, for example sixty seconds, the timer 130 times out whereby the contacts D-1 therein are opened to deenergize the relay coil D permitting the contacts D-2 to again open, thus deenergizing solenoid 38 and closing valve 34 to stop the metering of flush water to the mill 14.

When the timer 130 times out the contacts D-3 in FIGURE 3-A are closed to energize the timer 136 through the now closed contacts D-3 and normally closed contacts F-1, between the conductor 138 connected to the conductor 116 and the conductor 118. Energizing timer 136, which may be for example a three second timer, will energize the relay coil E contained therein to close the normally open contacts E-2 and therefore energize the relay coils G and F in circuit at this time between the conductors 138 and 118 on opposite sides of the source of electrical energy 98.

Energizing relay coil F will cause normally open contacts F-2 in FIGURE 3 to close whereby the relay coils F and G are energized through the conductor 140 in circuit with the relay coils F and G between the conductors 116 and 118. Thus when the timer 136 subsequently times out and deenergizes the relay coil E the relays F and G remain energized even though contacts E-2 open.

Energizing the relay coil G produces operation of the feed motor 142 indicated diagrammatically in association with FIGURE 3-A as controlled by the relay contacts G-1 whereby granular material is fed into the mill 14 and thus to the separator 12. Before the granular material is fed to the mill 14 the shields 80 and 82 are positioned between the light sources 76 and 78 and their respective light sensitive resistors 72 and 74 so that the light falling on the resistors 72 and 74 is insufficient to vary the resistance thereof enough to produce a signal through the amplifiers 126 and 128 to energize relay coil J or K connected in the output circuits of the amplifiers 126 and 128, respectively.

However, since in the usual case the granular material fed to the separator 50 on the operation of feed motor 142 will have an extremely high moldability a large percentage of the granular material will pass along the bottom of the separator 12 and fall on the balance plane 70 so that the balance will be tilted in a counterclockwise direction in opposition to the over-balance provided by the adjustable weights 84 and 86. With the balance so tilted the shields 80 and 82 are moved with the balance 18 to permit light from the light sources 76 and 78 to fall directly on the light sensitive resistors 72 and 74 so that amplifiers 126 and 128 will energize relay coils J and K.

With the relay coil J energized contacts J-1 which are opened when the shield 80 is in position between the light source 76 and the resistor 72 is closed to energize the solenoid 36 and open the valve 32 to meter substantial quantities of water into the mill 14 for conditioning the granular material therein. Similarly the relay contacts K-1 are closed when the shield 82 is thus moved from between the light source 78 and the light sensitive resistor 74 to energize the solenoid 38 and open valve 34 to meter additional water into the mill 14.

As the water is added to the mill 14 through the open valves 32 and 34 the moldability of the granular material fed to the separator 50 is gradually decreased until at some predetermined value of moldability the amount of granular material falling on the balance plate 68 is sufficient in comparison to the amount of granular material falling on the balance plate 70 to produce pivoting of the balance 18 in a clockwise direction. On clockwise pivoting of the balance 18 the shield 80 is first positioned between the light source 76 and the light sensitive resistor 72 to deenergize relay coil J, open contacts J-1 and thus deenergize solenoid 36 to close the valve 32. At this time the moisture metered to the mill 14 will be substantially reduced inasmuch as the valve 34 permits a smaller quantity of water to pass therethrough than the valve 32.

As the moldability of the granular material decreases even further due to the water which is still being metered into the mill 14 the balance 18 will pivot even further clockwise about the frictionless pivot band 66 to position the shield 82 between the light source 78 and the light sensitive resistor 74 to deenergize the relay coil K and open the contacts K-1 whereupon solenoid 38 is deenergized and valve 34 is also closed halting the metering of water to the granular material in the mill 14. The amount of water in the mill 14 at this time will be exactly that required to bring the granular material therein to the required moldability.

A manual override switch 144 is provided in series with each of the solenoids 36 and 38 to permit the addition of additional water to the granular material manually if such additional water is desired. Also the solenoids 36 and 38 are in series with a valve on-off switch 146 which may be used to prevent addition of water to the granular material on closing of the relays K-1 and J-1 if this is desired.

Relay coil J when energized also closes the relay contacts J-2 in FIGURE 3-A to energize relay coil H. Relay coil H then closes contacts H-1 which provides a holding circuit for both the relay coil H and the timer 148 so that the timer 148 is energized even after the relay coil J has become deenergized and the contacts J-2 have again opened. The timer 148, operation of which is indicated by lamp 150, is set to time out at some time greater than that required for the conditioning cycle of the granular material.

When the timer 148 times out the relay coil L thereof is energized to open the normally closed contacts L-2 of FIGURE 3 thereby deenergizing the relay coil C and opening the contacts C-2 to deenergize the rest of the circuit including the timer 148 so that the circuit is ready for a subsequent cycle of operation.

Thus it will be seen that in accordance with the invention there is provided a relatively simple apparatus for efficiently controlling the moldability of a granular material through the direct measurement of the moldability thereof and the metering of an additive such as water to the granular material in accordance with the measured moldability. Such operation is more direct than controlling the individual percentages of additives in the granular material and compensating for other factors which effect moldability such as the composition of the granular material as has previously been the practice in conditioning granular material.

The modification 152 of the granular material conditioning apparatus 10 illustrated in FIGURE 4 comprises the mill 154, the separator 156 and vibrator 158. The frictionless balance 160, means 162 for metering an additive such as water to mill 154, and means 164 for controlling the metering of additive to the mill 154 in accordance with the position of the balance 160 are also included in the granular material conditioning apparatus 152.

The mill 154, vibrator 158, metering means 162 and the control means 164 of the granular material conditioning apparatus 152 are entirely similar to the mill 14, vibrator 54, the metering means 21 and the control means 19, illustrated in FIGURES 3 and 3-A of the apparatus 10. These elements in the modified granular material conditioning apparatus 152 will not therefore be considered in detail.

The separator 156 of the apparatus 152 however includes only a single screen 172 secured to the vibrator 158 for vibration thereby and means 174 for feeding a uniform sample quantity of granular material from the mill 154 onto the screen 172. The means 174 may be for example a reservoir for the sample quantity of granular material from mill 154 having a member 176 which may be variably positioned to permit a constant volume of the sample quantity of granular material to flow therefrom onto the screen 172.

In operation the uniform sample of granular material is advanced across the screen 172 by operation of the vibrator 158 as previously discussed. During advancing of the granular material across the screen 172 the sample quantity of granular material is separated in accordance with the moldability thereof. A portion of the granular material is carried across the screen 172 and is discharged from the end 178 thereof. The balance of the uniform sample of granular material is discharged through the screen 172 into the collecting bin 180.

The portion of the granular material which is discharged from the end 178 of the screen 172 falls on the balance plane 182 of balance 160 causing a counterclockwise rotation of the balance 160 about the frictionless pivot band 188 by an amount determined by the positioning of the adjustable weight 184 on the bar 186. The bar 186 and inclined balance plane 182 as illustrated in FIGURE 4 are secured to opposite sides of the pivot band 188.

The shields 190 and 192 are rigidly secured to the balance plane 182 for movement therewith into and out of shielding relation with respect to the light sensitive resistors 194 and 196 respectively, to regulate their illumination by light sources 198 and 200 in the manner previously considered with reference to the apparatus 10 to control the metering of additive to the mill 154 and therefore the moldability of the granular material in the mill.

In addition in the modified granular material conditioning apparatus 152 means 202 are provided for periodically cleaning the screen 172 mechanically thereby removing the necessity for heating the screen 172 to prevent clogging of the openings thereof by compacted granular material. The screen cleaning means 202 includes an endless belt 204 supported for movement about pulleys 206 and 208. The endless belt 204 is provided with brushes 210 attached thereto which are periodically passed over the screen 172 at the same rate as the granular material is passed thereover so that the granular material is not moved by the brushes. Pulley 208 is connected to convenient drive means such as the motor 212 or the vibrator 158 for synchronizing the driving of the brushes 210 along the screen 172 at the same rate as the granular material travels thereover.

Thus both the frictionless balance 160 and the separator 156 of the modified apparatus 152 of FIGURE 4 are simpler than the balance 18 and separator 12 of the granular material conditioning apparatus 10.

The granular material conditioning apparatus 214 of FIGURE 5 is another modification of apparatus 10 and comprises the mill 216, means 218 for metering an additive to the mill 216 and means 220 for controlling the metering of the additive to the mill 216 in accordance with the position of the balance 222. Each of these portions of the apparatus 214 are entirely similar to the corresponding portions of the apparatus 10 and will not therefore be considered in detail.

In the granular material conditioning apparatus 214 illustrated in FIGURE 5 the sample quantity of granular material from the mill 216 is first transferred from the mill 216 to the means 224 for providing a uniform sample of the granular material which is entirely similar to the means 174 of the apparatus 152. The uniform sample of granular material is fed from means 224 onto the continuous belt 226 which is supported by platform 227 and caused to travel in a clockwise direction about pulleys 228 and 230 at a constant speed by the motor 232.

The sample quantity of granular material on belt 226 is thus caused to advance to the right in FIGURE 5 and pass under the roller 234 pivotally mounted at 236 which roller is operable to compact the uniform sample quantity of granular material. On continued rightward movement the end 238 of the compacted uniform sample quantity of granular material is cantilevered beyond the pulley 228 a distance determined by the bending strength of the compacted granular material.

On the bending strength of the compacted granular material reaching a predetermined value the length of the cantilever will be sufficient to contact the balance 222 to pivot it about the frictionless band pivot support 240 thereof. Since the bending strength of the compacted sample of granular material is related to the moldability of the compacted granular material the movement of the balance plane 223 in a counterclockwise direction in opposition to the adjustable weight 242 may be used as a measurement of the moldability of the granular material in the mill 216 to control the quantity of additive metered to the mill 216 as before.

In the modification of the apparatus 214 illustrated in FIGURE 6 the balance 244 is positioned over the continuous belt 246 which is similar to the continuous belt 266 of the apparatus 214 and is biased in a clockwise direction by the resilient means 248. Thus with the modification of the apparatus 214 illustrated in FIGURE 6 the balance 224 is positioned in accordance with the compressive strength of the compacted uniform sample of granular material rather than with the bending strength thereof as is the case with apparatus 214. Since the compressive strength of the compacted granular material is also related to the moldability thereof the position of the balance 244 may also be used to control the addition of additive to a granular material to provide a granular material of predetermined moldability.

The modification 250 of the granular material conditioning apparatus 10 illustrated in FIGURE 7 includes the mill 252 and means 254 for metering an additive to the mill 250. Switch means 256 for sensing the moldability of the granular material and means 258 for controlling the metering of an additive into the mill 252 in accordance with the sensed moldability of the granular material are also provided in conjunction with the granular material conditioning apparatus 250.

The mill 250 includes the cylindrical container 260 in which granular material is mulled by means of the rollers 262 and scrapers 264 mounted on the rotatable shaft 266. The container 260 is provided with an opening 268 in one side wall thereof at the level of the rollers 262 in which a sleeve 270 supporting the orifice plate 272 at its inner end is secured. The sleeve 270 is provided with an insert of low friction material 274 having a conical inner surface increasing in diameter outwardly of the container 260.

The means for metering an additive to the mill 252 includes the supply conduit 280 having the solenoid operated valve 282 therein. The valve 282 is opened on energization of the solenoid 284 of the control means 258.

In operation as the granular material is mulled in the mill 252 a sample quantity thereof is compacted and forced out of the container 260 through the opening 276 in the orifice plate 272 to provide a cantilevered sample of granular material 278 having a length related to the moldability of the granular material in the mill 252.

Before the moldability of the granular material is such as to produce a cantilevered sample 278 engageable with the pivoted lever 288 of switch means 256 the solenoid 284 is energized with the power on-off switch 290 is closed and the contacts M-2 which are normally open are closed. The contacts M-2 are initially closed by pressing the switch 292 which is normally biased in an open position to energize the relay M through the closed switch contact 294.

Energizing the relay M establishes a holding circuit through the contacts M-2 around the switch 292 and closes the normally open contacts M-1 to complete the circuit through the solenoid 284 from the source of electrical energy 296. As the additive is added to the granular material in the mill 252 and the moldability thereof decreases a moldability is reached producing a cantilevered sample 278 of length to engage the lever 288. Lever 288 will then be pivoted in a counterclockwise direction about the pivot mounting means 298 to move the switch contact 294 to an open position.

The relay coil M is thus deenergized so that the normally open contacts M-1 and M-2 return to their open position. Opening of the contacts M-1 deenergizes solenoid 284 to close the valve 282 and stop the metering of the additive to the granular material in the mill 252. Opening of the contacts M-2 prevents reenergizing of the relay M if the switch contact 294 is subsequently closed due to pivoting of the lever 288 in a clockwise direction due to breaking of the cantilevered sample of granular material. Relay M will not be reenergized until switch 292 is again closed.

The drawings and the foregoing specification constitute a description of the improved method and apparatus for testing and controlling moldability of granular material in such full, clear, concise and exact terms as to enable any person skilled in the art to practice the invention, the scope of which is indicated by the appended claims.

What we claim as our invention is:

1. Apparatus for conditioning granular material comprising a mill for mulling granular material, means for metering an additive into the mill to vary the moldability of the granular material in the mill, a separator for separating a portion of granular material transferred thereto from the balance thereof in accordance with the moldability of the granular material, means for transferring a sample quantity of granular material from the mill to the separator, movable means located to receive the portion of the sample quantity of granular material separated by said separator and movable thereby into a position representative of the moldability of the sample quantity of granular material, means supporting said movable means free of frictional resistance to movement thereof, and means responsive to the position of said movable means controlling the means for metering the additive to the mill.

2. Apparatus for conditioning granular material comprising a mill for mulling granular material, means for metering an additive into the mill to vary the moldability of the granular material in the mill, a separator for separating a portion of granular material transferred thereto from the balance thereof in accordance with the moldability of the granular material, means for transferring a sample quantity of granular material from the mill to the separator, a balance including supporting means therefor offering no external frictional resistance to movement thereof located to receive the portion of the sample quantity of granular material separated by said separator and movable thereby into a position representative of the moldability of the sample quantity of granular material, and means responsive to the position of said balance controlling the means for metering the additive to the mill.

3. Structure as claimed in claim 2 wherein said supporting means comprises an elongated pivot band of elastic material fixedly mounted at both ends and said balance further includes an inclined balance plane secured to at least one side of the band.

4. Stucture as claimed in claim 2 wherein said separator includes a vibrated screen over which the portion of granular material passes and further including means for cleaning said screen comprising a brush and means for periodically moving said brush over said screen at the same rate as the portion of granular material passes thereover.

5. Apparatus for conditioning granular material comprising a mill for mulling granular material, means for metering an additive into the mill to vary the moldability of the granular material in the mill, a separator for separating a portion of granular material transferred thereto from the balance thereof in accordance with the moldability of the granular material, means for transferring a sample quantity of granular material from the mill to the separator, a balance including supporting means therefor offering no external frictional resistance to movement thereof located to receive the portion of the sample quantity of granular material separated by said separator and movable thereby into a position representative of the moldability of the sample quantity of granular material, means responsive to the position of said balance controlling the means for metering the additive to the mill, and adjustable bias means operably associated with said balance for urging the balance toward a position to stop the metering of the additive into the mill.

6. Apparatus for conditioning granular material comprising a mill for mulling granular material, means for metering an additive into the mill to vary the moldability of the granular material in the mill, a separator for separating a portion of granular material transferred thereto from the balance thereof in accordance with the moldability of the granular material, means for feeding a sample quantity of the granular material to the separator at a uniform rate, a frictionless balance located to receive the portion of the sample quantity of granular material separated by said separator and movable thereby into a position representative of the moldability of the sample quantity of granular material, and means responsive to the position of said frictionless balance controlling the means for metering the additive to the mill.

7. Structure as claimed in claim 6 wherein said frictionless balance comprises a pivot band of elastic material fixedly mounted at both ends, an inclined balance plane secured to one side of the pivot band and an adjustable weight secured to the other side of the pivot band.

8. Apparatus for conditioning granular material comprising a mill for mulling granular material, means for metering an additive to the mill in a plurality of stages to vary the moldability of the granular material in the mill, a separator for separating a portion of granular material transferred thereto from the balance thereof in accordance with the moldability of the granular material, means for transferring a sample quantity of granular material from the mill to the separator, movable means located to receive the portion of the sample quantity of granular material separated by said separator and movable thereby into a position representative of the moldability of the sample quantity of granular material, and separate means including individual light sensitive elements responsive to the positioning of said movable means controlling the means for metering the additive to the mill in each of said plurality of stages.

9. Structure as claimed in claim 8 wherein said means controlling the means for metering the additive to the mill in each of said stages further includes separate fixedly mounted light sources positioned to illuminate a corresponding one of said light sensitive elements, individual light shields carried by said movable means for movement into and out of light shielding position between the light sources and corresponding light sensitive element and an electric control circuit connected to the light sensitive elements for energization on light from the corresponding light source illuminating the light sensitive element.

10. Structure as set forth in claim 9 wherein said means for metering an additive to the mill in a plurality of stages comprises a separate solenoid operated valve for each of the separate stages, and said electric control circuit includes means for developing an amplified electrical signal during illumination of each of the corresponding light sensitive elements and separate solenoids for operating the solenoid operating valves responsive to the developed electric signals operable to sequentially close the valves.

11. Structure as claimed in claim 10 wherein said control circuit further includes a timer for fixing the over-all cycle time for metering an additive to the mill regardless of the length of time of energizing of the solenoids.

12. Structure as claimed in claim 11 wherein said control circuit further includes a timer and relay contacts for energizing one of the valve actuating solenoids to provide mill wash water before the energizing of the cycle timer during each cycle of the granular material conditioning apparatus.

13. The method of conditioning granular material which comprises mulling the granular material in a mill, feeding a uniform sample of the granular material to a separator screen, traversing the uniform sample across the separator screen to separate a portion thereof from the balance of the sample the relative weight of which portion is representative of the moldability of the granular material, discarding said balance of the sample, and controlling the metering of an additive into the mill only in accordance with the relative weight of the portion of the sample separated from the balance of the sample.

14. Apparatus for conditioning granular material comprising a mill for mulling granular material to form cohesive masses therein, means for metering an additive into the mill to vary the moldability of the granular material in the mill as measured by the cohesiveness thereof, movable means free of external friction located adjacent said mill, means responsive to the position of said movable means for controlling the means for metering the additive to the mill, means positioned relative to said mill for receiving a sample of granular material therefrom and for separating a portion of the sample therefrom in accordance with its cohesiveness, means for feeding said separated portion of the sample to said movable means for positioning said movable means in accordance with the cohesiveness and therefore the moldability of said granular material.

References Cited in the file of this patent

UNITED STATES PATENTS

| | | |
|---|---|---|
| 2,734,735 | Payne | Feb. 14, 1956 |
| 2,791,120 | Dietert et al. | May 7, 1957 |
| 2,854,714 | Dietert | Oct. 7, 1958 |

FOREIGN PATENTS

| | | |
|---|---|---|
| 833,324 | Great Britain | Apr. 21, 1960 |